(12) United States Patent
Liang et al.

(10) Patent No.: US 8,988,317 B1
(45) Date of Patent: Mar. 24, 2015

(54) DEPTH DETERMINATION FOR LIGHT FIELD IMAGES

(71) Applicant: Lytro, Inc., Mountain View, CA (US)

(72) Inventors: Chia-Kai Liang, San Jose, CA (US); Colvin Pitts, Snohomish, WA (US); Kurt Akeley, Saratoga, CA (US); Alex Song, San Jose, CA (US)

(73) Assignee: Lytro, Inc., Mountain View, CA (US)

( * ) Notice: Subject to any disclaimer, the term of this patent is extended or adjusted under 35 U.S.C. 154(b) by 0 days.

(21) Appl. No.: 14/302,826

(22) Filed: Jun. 12, 2014

(51) Int. Cl.
| | |
|---|---|
| *G09G 3/00* | (2006.01) |
| *G09G 3/14* | (2006.01) |
| *G06T 15/10* | (2011.01) |
| *G06T 15/20* | (2011.01) |
| *G06T 15/00* | (2011.01) |
| *G02B 27/00* | (2006.01) |

(52) U.S. Cl.
CPC ............... *G06T 15/00* (2013.01); *G06T 15/205* (2013.01); *G02B 27/0075* (2013.01)
USPC .................... 345/32; 345/46; 345/427

(58) Field of Classification Search
USPC ............................................ 345/46, 427, 32
See application file for complete search history.

(56) References Cited

U.S. PATENT DOCUMENTS

| | | | |
|---|---|---|---|
| 4,661,986 A | 4/1987 | Adelson | |
| 5,282,045 A | 1/1994 | Mimura et al. | |
| 5,748,371 A | 5/1998 | Cathey, Jr. et al. | |
| 6,023,523 A | 2/2000 | Cohen et al. | |
| 6,201,899 B1 | 3/2001 | Bergen | |
| 6,320,979 B1 | 11/2001 | Melen | |
| 6,466,207 B1 | 10/2002 | Gortler et al. | |
| 7,620,309 B2 | 11/2009 | Georgiev | |
| 7,623,726 B1 | 11/2009 | Georgiev | |
| 7,936,392 B2 | 5/2011 | Ng et al. | |

(Continued)

FOREIGN PATENT DOCUMENTS

| | | |
|---|---|---|
| WO | 03052465 | 6/2003 |
| WO | 2006039486 | 4/2006 |

(Continued)

OTHER PUBLICATIONS

Bolles, R., et al., "Epipolar-Plane Image Analysis: An Approach to Determining Structure from Motion", International Journal of Computer Vision, 1, 7-55 (1987).

(Continued)

*Primary Examiner* — Kimbinh T Nguyen
*Assistant Examiner* — Raffi Isanians
(74) *Attorney, Agent, or Firm* — Raubvogel Law Office

(57) ABSTRACT

Depth information is determined for elements in a light field image, thus allowing for rapid display of visualization tools to communicate such depth information to a user. Depth of strong edges within the light field image is analyzed, providing improved reliability of depth information while reducing or minimizing the amount of computation involved in generating such information. Strong edges can be identified and analyzed by generating epipolar images, or EPIs, from the light field image. Local gradients are determined for pixels in the EPIs. The magnitude of the local gradient is used to determine a confidence as to whether depth can be reliably estimated from the gradient. The orientation of the gradient is used to determine the depth of a corresponding element of the scene. Suitable output is then generated based on the determined depths, for example to provide information and feedback to aid a user in capturing light-field images.

21 Claims, 15 Drawing Sheets

(56) References Cited

U.S. PATENT DOCUMENTS

| | | | |
|---|---|---|---|
| 7,949,252 | B1 | 5/2011 | Georgiev |
| 8,189,089 | B1 | 5/2012 | Georgiev et al. |
| 8,290,358 | B1 | 10/2012 | Georgiev |
| 8,559,705 | B2 | 10/2013 | Ng |
| 8,619,082 | B1 * | 12/2013 | Ciurea et al. ............ 345/427 |
| 8,724,014 | B2 | 5/2014 | Ng et al. |
| 8,811,769 | B1 | 8/2014 | Pitts et al. |
| 2003/0123700 | A1 | 7/2003 | Wakao |
| 2007/0019883 | A1 | 1/2007 | Wong et al. |
| 2007/0230944 | A1 | 10/2007 | Georgiev |
| 2007/0269108 | A1 | 11/2007 | Steinberg et al. |
| 2008/0018668 | A1 | 1/2008 | Yamauchi |
| 2013/0082905 | A1 * | 4/2013 | Ranieri et al. ............ 345/32 |
| 2013/0342526 | A1 | 12/2013 | Ng et al. |
| 2014/0098191 | A1 * | 4/2014 | Rime et al. ............ 348/46 |

FOREIGN PATENT DOCUMENTS

| | | |
|---|---|---|
| WO | 2007092545 | 8/2007 |
| WO | 2007092581 | 8/2007 |

OTHER PUBLICATIONS

Heidelberg Collaboratory for Image Processing, "Consistent Depth Estimation in a 4D Light Field", May 2013.

Liang, Chia-Kai, et al., "Programmable Aperture Photography: Multiplexed Light Field Acquisition", ACM SIGGRAPH 2008.

Tao, Michael, et al., "Depth from Combining Defocus and Correspondence Using Light-Field Cameras", Dec. 2013.

Wanner, S., et al., "Variational Light Field Analysis for Disparity Estimation and Super-Resolution", IEEE Transactions on Pattern Analysis and Machine Intelligence, 2013.

Wanner, S., et al., "Globally Consistent Depth Labeling of 4D Light Fields", IEEE Conference on Computer Vision and Pattern Recognition, 2012.

Fernando, Randima. "Depth of Field: A Survey of Techniques." GPU Gems. Boston, MA: Addison-Wesley, 2004.

Haeberli, "A Multifocus Method for Controlling Depth of Field" GRAPHICA Obscura, 1994, pp. 1-3.

Kopf, J., et al., Deep Photo: Model-Based Photograph Enhancement and Viewing, SIGGRAPH Asia 2008.

Levin, A., et al., "Image and Depth from a Conventional Camera with a Coded Aperture", SIGGRAPH 2007, pp. 1-9.

Levoy, M., "Autofocus: Contrast Detection", http://graphics.stanford.edu/courses/cs178/applets/autofocusPD.html, pp. 1-3, 2010.

Levoy, Marc, "Autofocus: Phase Detection", http://graphics.stanford.edu/courses/cs178/applets/autofocusPD.html, pp. 1-3, 2010.

Ng, R., et al. "Light Field Photography with a Hand-held Plenoptic Camera," Stanford Technical Report, CSTR 2005-2, 2005.

Ng, R., "Digital Light Field Photography," Dissertation, Department of Computer Science, Stanford University, Jun. 2006.

Ng., R., "Fourier Slice Photography," ACM Transactions on Graphics, Proceedings of SIGGRAPH 2005, vol. 24, No. 3, 2005, pp. 735-744.

Nguyen, Hubert. "Practical Post-Process Depth of Field." GPU Gems 3. Upper Saddle River, NJ: Addison-Wesley, 2008.

Autofocus systems and methods (http://en.wikipedia.org/wiki/Autofocus). Retrieved Jan. 2013.

* cited by examiner 721
(x,u) slice for y

DEPTH DETERMINATION FOR LIGHT FIELD IMAGES

CROSS-REFERENCE TO RELATED APPLICATION

The present application is related to U.S. Utility application Ser. No. 13/774,986 for "Light field Processing and Analysis, Camera Control, and User Interfaces and Interaction on Light field Capture Devices", filed on Feb. 22, 2013, which is incorporated herein by reference.

TECHNICAL FIELD

The present document relates to techniques for determining depth in light field images.

BACKGROUND

Light field capture devices (also referred to as "light field image data acquisition devices") are defined herein as any devices that are capable of capturing light field data, optionally processing light field data, optionally accepting and acting upon user input, and/or optionally displaying or otherwise outputting images and/or other types of data.

Light field capture devices may capture light field data using any suitable method for doing so. One example of such a method includes, without limitation, using a microlens array disposed between a main lens and an image sensor (e.g., a CCD or CMOS sensor) as described in Ng et al., Light field photography with a hand-held plenoptic capture device, Technical Report CSTR 2005-02, Stanford Computer Science. Other examples include the use of a plurality of independently controlled cameras, each with its own lens and sensor, an array of cameras that image onto a single shared sensor, a plenoptic lens, and/or any combination of these.

Light field data may be represented or encoded in any of a number of different ways, including (but not limited to) as a 4D image, as a 2D array of 2D disk images such as described in Ng et al., as a 2D array of 2D images of a scene taken from different perspectives such as would be captured by an array of cameras (and which are known as "sub-aperture" images in Ng et al.), and as any combination of these.

Whichever representation is used, light field data captured by a light field capture device may be processed to produce a 2D image that is suitable for display or output. Such light field processing can include (but is not limited to) generating refocused images, generating perspective views of a scene, generating depth maps of a scene, generating all-in-focus or extended depth of field (EDOF) images, generating parallax-shifted or perspective views of a scene, generating stereo image pairs, and/or any combination of these. Additionally, such generated 2D images may be modified or annotated based on the results of analysis of the light field data performed by algorithms that process the captured light field data.

SUMMARY

Data captured by light field capture devices contains information from which scene depths may be inferred or measured. Such depth information can be useful for many applications; for example, the range of depths captured in a scene is related to the set of possible 2D images which may be rendered from (or projected from) the captured light field data. The "amount of refocusing", the "3D-ness", and the range of perspective/parallax shifting that is possible from a captured set of light field data is, in general, proportional to the dioptric range of scene depths that were captured.

It is useful, therefore, to determine or estimate depths of various elements and/or subjects of a captured light field image. As described in related U.S. Utility application Ser. No. 13/774,986 for "Light field Processing and Analysis, Camera Control, and User Interfaces and Interaction on Light field Capture Devices", filed on Feb. 22, 2013, it is also helpful to provide visualization tools to assist the user in controlling the camera and positioning subjects at an appropriate depth range. In order to provide such visualization tools in an effective and responsive manner, it is beneficial to determine depth information for scene elements quickly.

Accordingly, various embodiments as described herein provide mechanisms for improved techniques for rapidly determining depth information for elements in a light field image, thus allowing for rapid and responsive display of visualization tools to communicate such depth information to a user.

In at least one embodiment, a depth estimation method operates by analyzing the depth of strong edges within the light field image, thus providing improved reliability of depth information while reducing or minimizing the amount of computation involved in generating such information.

In at least one embodiment, strong edges are identified and analyzed as follows. The light field data (initially represented as 4D values x,y,u,v) is rearranged into an array of epipolar images, or EPIs, consisting of the x/u slice of the light field data at each y, or the y/v slice of the light field data at each x. Then, for each pixel in the EPI, a local gradient is calculated. If the magnitude of the local gradient exceeds a predefined threshold, depth can be reliably estimated from the gradient; therefore, the orientation of the gradient is used to determine the depth of the corresponding element of the scene.

A depth map is then generated from the determined depths of various areas of the light field image. The depth map can then be used as a basis for any suitable form of output, such as in a user interface for providing information and feedback to aid a user in capturing light-field images, as depicted and described in the above-referenced related U.S. Utility application.

Further details and variations are described herein.

BRIEF DESCRIPTION OF THE DRAWINGS

The accompanying drawings illustrate several embodiments. Together with the description, they serve to explain the principles and operational mechanics of the embodiments. One skilled in the art will recognize that the particular embodiments illustrated in the drawings are merely exemplary, and are not intended to limit scope.

DETAILED DESCRIPTION

Definitions

Figure 1A:
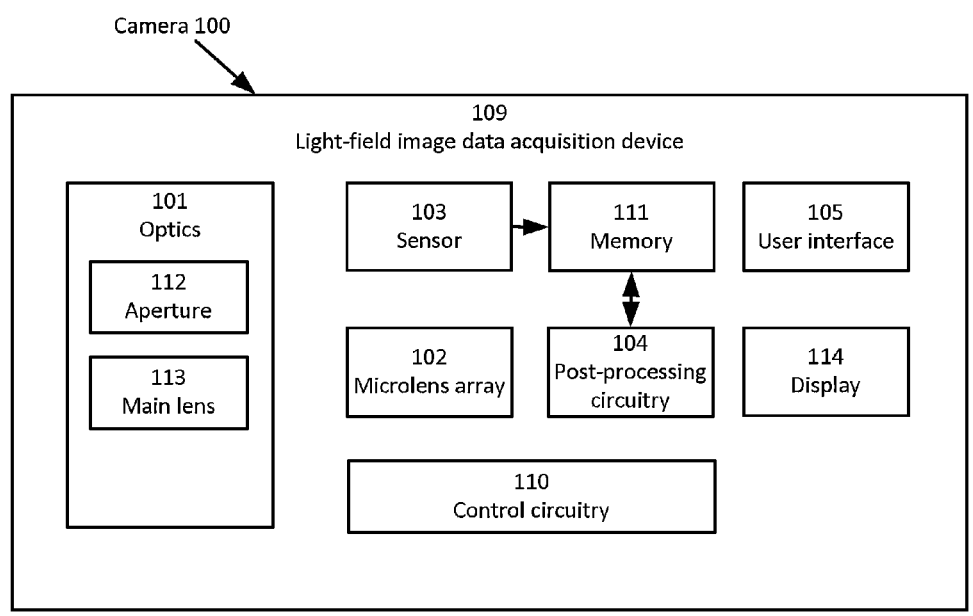
FIG. 1A depicts an example of an architecture for performing depth determination in a light field capture device, according to one embodiment.

For purposes of the description provided herein, the following definitions are used:

Aperture Plane: A plane aligned with the aperture of a camera or other image capture apparatus. Each position in the aperture plane corresponds to a coordinate represented by (u,v).

Depth map: a representation of the depth of objects within a scene at various locations in an image.

Disk: a region in a light field image that is illuminated by light passing through a single microlens; may be circular or any other suitable shape.

Epipolar image (EPI): An image formed by taking the (x,u) slice of the light field at each y, or (y,v) slice at each x.

Image: a two-dimensional array of pixel values, or pixels, each specifying a color.

Light field: a collection of rays representing 4D ray space information of a scene. A ray's direction specifies a path taken by light, and its color specifies the radiance of light following that path. For each light ray, (x,y) represents the coordinate of the intersection point on the microlens array plane and (u,v) represents the coordinate of the intersection point on the aperture plane. The light field can be represented as a 4D function $L(x,y,u,v)$.

Light field image: a two-dimensional image that spatially encodes a four-dimensional light field. The sensor image from a light field camera is a light field image.

Microlens: a small lens, typically one in an array of similar microlenses, referred to as a microlens array (MLA).

Microlens Array Plane (MLA plane): A plane aligned with the MLA. Each position in the MLA plane corresponds to a coordinate represented by (x,y).

Pixel: an n-tuple of intensity values, with an implied meaning for each value. A typical 3-tuple pixel format is RGB, wherein the first value is red intensity, the second green intensity, and the third blue intensity. Also refers to an individual sensor element for capturing data for a pixel.

Representative Ray: a single ray that represents all the rays that reach a pixel.

Splatting: A process of generating regularly sampled (x,u) and (y,v) slices to map input light field to output.

Two-dimensional image (or image): a two-dimensional array of pixels, each specifying a color. The pixels are typically arranged in a square or rectangular Cartesian pattern, but other patterns are possible.

Two-dimensional image processing: any type of changes that may be performed on a two-dimensional image.

In addition, for ease of nomenclature, the term "camera" is used herein to refer to an image capture device or other data acquisition device. Such a data acquisition device can be any device or system for acquiring, recording, measuring, estimating, determining and/or computing data representative of a scene, including but not limited to two-dimensional image data, three-dimensional image data, and/or light field data. Such a data acquisition device may include optics, sensors, and image processing electronics for acquiring data representative of a scene, using techniques that are well known in the art, are disclosed herein, or could be conceived by a person of skill in the art with the aid of the present disclosure.

One skilled in the art will recognize that many types of data acquisition devices can be used, and that the system and method described herein are not limited to cameras. Thus, the use of the term "camera" herein is intended to be illustrative and exemplary, but should not be considered to limit scope. Specifically, any use of such term herein should be considered to refer to any suitable device for acquiring image data.

In the following description, several techniques and methods for processing light field images are described. One skilled in the art will recognize that these various techniques and methods can be performed singly and/or in any suitable combination with one another.

Architecture

In at least one embodiment, the system and method described herein can be implemented in connection with light field images captured by light field capture devices including but not limited to those described in Ng et al., Light field photography with a hand-held plenoptic capture device, Technical Report CSTR 2005-02, Stanford Computer Science.

Figure 1B:
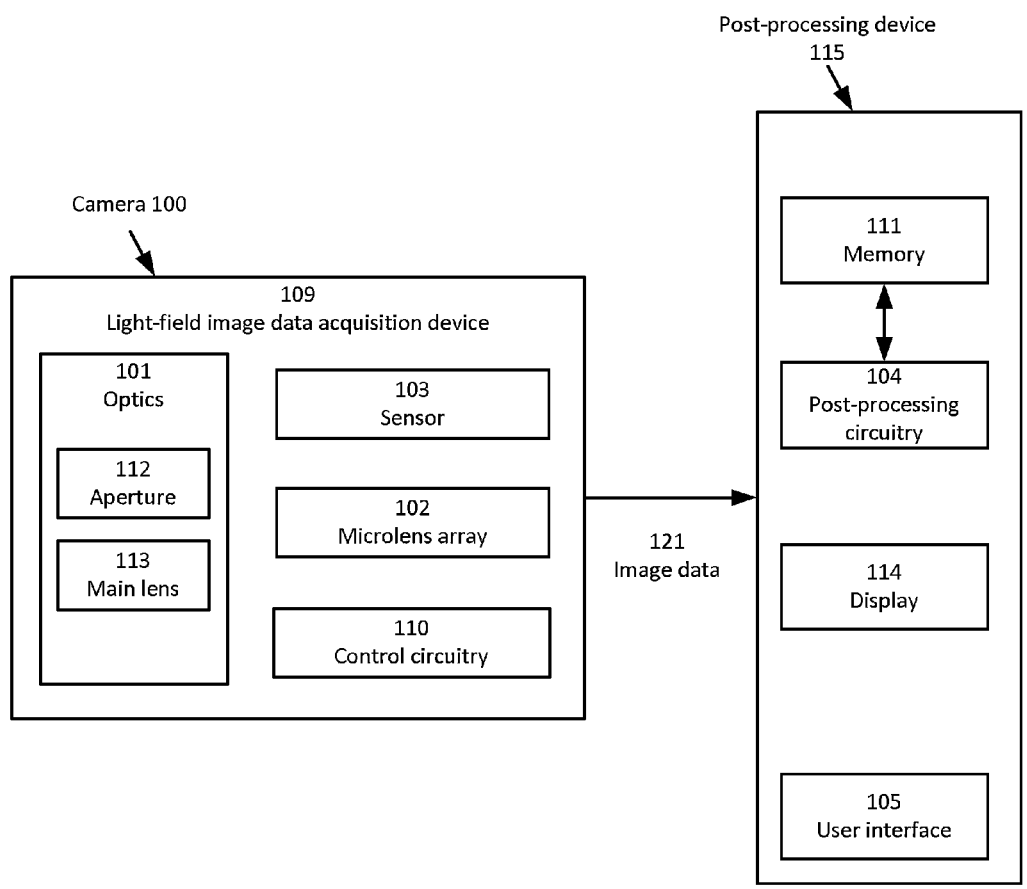
FIG. 1B depicts an example of an architecture for performing depth determination in a post-processing system communicatively coupled to a light field capture device, according to one embodiment.

Referring now to FIG. 1A, there is shown a block diagram depicting an architecture for performing depth determination in a light field capture device such as a camera 100. Referring now also to FIG. 1B, there is shown a block diagram depicting an architecture for performing depth determination in a post-processing system communicatively coupled to a light field capture device such as a camera 100, according to one embodiment. One skilled in the art will recognize that the particular configurations shown in FIGS. 1A and 1B are merely exemplary, and that other architectures are possible for camera 100. One skilled in the art will further recognize that several of the components shown in the configurations of FIGS. 1A and 1B are optional, and may be omitted or reconfigured. Other components as known in the art may additionally or alternatively be added.

In at least one embodiment, camera 100 may be a light field camera that includes light field image data acquisition device 109 having optics 101, image sensor or sensor 103 (including a plurality of individual sensors for capturing pixels), and microlens array 102. Optics 101 may include, for example, aperture 112 for allowing a selectable amount of light into camera 100, and main lens 113 for focusing light toward microlens array 102. In at least one embodiment, microlens array 102 may be disposed and/or incorporated in the optical path of camera 100 (between main lens 113 and sensor 103) so as to facilitate acquisition, capture, sampling of, recording, and/or obtaining light field image data via sensor 103.

Figure 2:
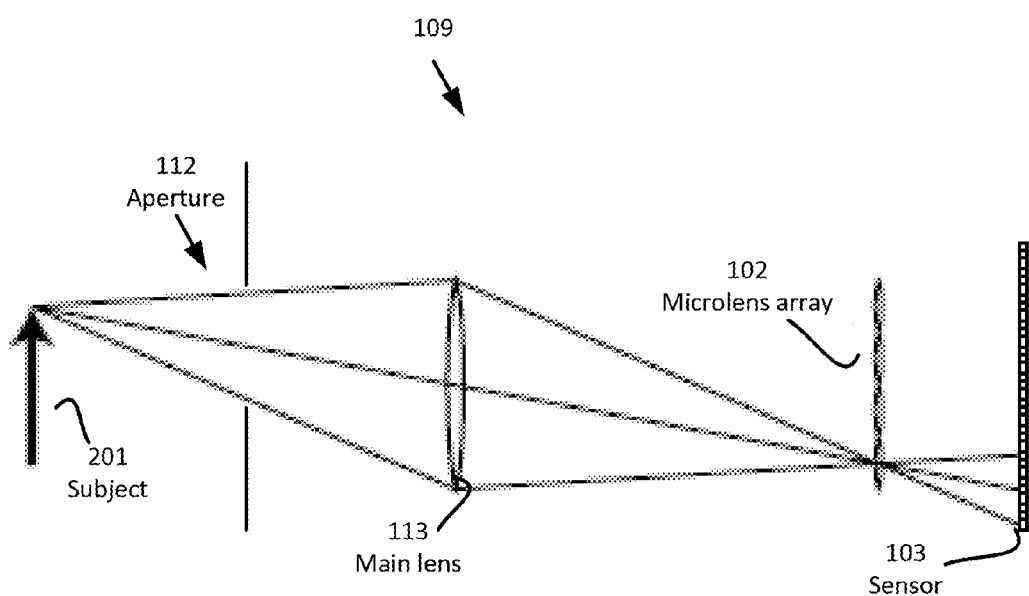
FIG. 2 depicts an example of an architecture for a light field image data acquisition device, such as a camera, according to one embodiment.

Referring now also to FIG. 2, there is shown an example of an architecture for a light field image data acquisition device 109, such as camera 100, according to one embodiment. FIG. 2 is not shown to scale. FIG. 2 shows, in conceptual form, the relationship between aperture 112, main lens 113, microlens array 102, and sensor 103, as such components interact to capture light field data for subject 201.

In at least one embodiment, camera 100 may also include a user interface 105 for allowing a user to provide input for controlling the operation of camera 100 for capturing, acquiring, storing, and/or processing image data. In at least one embodiment, the techniques described herein provide mechanisms for display of depth information in connection with user interface 105. Such depth information can be displayed, for example, on display device 114 which may be a display screen on camera 100.

In at least one embodiment, camera 100 may also include control circuitry 110 for facilitating acquisition, sampling, recording, and/or obtaining light field image data. For example, control circuitry 110 may manage and/or control (automatically or in response to user input) the acquisition timing, rate of acquisition, sampling, capturing, recording, and/or obtaining of light field image data.

In at least one embodiment, camera 100 may include memory 111 for storing image data, such as output by sensor 103. The memory 111 can include external and/or internal memory. In at least one embodiment, memory 111 can be provided at a separate device and/or location from camera 100. For example, camera 100 may store raw light field image data, as output by sensor 103, and/or a representation thereof, such as a compressed image data file. In addition, as described in related U.S. Utility application Ser. No. 12/703,367 for "Light field Camera Image, File and Configuration Data, and Method of Using, Storing and Communicating Same,", filed Feb. 10, 2010, memory 111 can also store data representing the characteristics, parameters, and/or configurations (collectively "configuration data") of field image data acquisition device 109.

In at least one embodiment, captured image data is provided to post-processing circuitry 104. Such processing circuitry 104 may be disposed in or integrated into light field image data acquisition device 109, as shown in FIG. 1A, or it may be in a separate post-processing device 115 external to light field image data acquisition device 109, as shown in FIG. 1B. Such separate component may be local or remote with respect to light field image data acquisition device 109. The post-processing circuitry 104 may include a processor of any known configuration, including microprocessors, ASICS, and the like. Any suitable wired or wireless protocol can be used for transmitting image data 121 to processing circuitry 104; for example, the camera 100 can transmit image data 121 and/or other data via the Internet, a cellular data network, a Wi-Fi network, a Bluetooth communication protocol, and/or any other suitable means. In at least one embodiment, the techniques described herein provide mechanisms for display of depth information (such as a depth map) in connection with user interface 105. Such depth information can be displayed, for example, on display device 114 which may be a display screen on device 115.

Overview of Light Field Image Capture

Light field images often include a plurality of projections (which may be circular or of other shapes) of aperture 112 of camera 100, each projection taken from a different vantage point on the camera's focal plane. The light field image may be captured on sensor 103. The interposition of microlens array 102 between main lens 113 and sensor 103 causes images of aperture 112 to be formed on sensor 103, each microlens in the microlens array 102 projecting a small image of main-lens aperture 112 onto sensor 103. These aperture-shaped projections are referred to herein as disks, although they need not be circular in shape.

Light field images include four dimensions of information describing light rays impinging on the focal plane of camera 100 (or other capture device). Two spatial dimensions (herein referred to as x and y) are represented by the disks themselves. For example, the spatial resolution of a light field image with 120,000 disks, arranged in a Cartesian pattern 400 wide and 300 high, is 400×300. Two angular dimensions (herein referred to as u and v) are represented as the pixels within an individual disk. For example, the angular resolution of a light field image with 100 pixels within each disk, arranged as a 10×10 Cartesian pattern, is 10×10. This light field image has a four-dimensional (x,y,u,v) resolution of (400,300,10,10).

Figure 3:
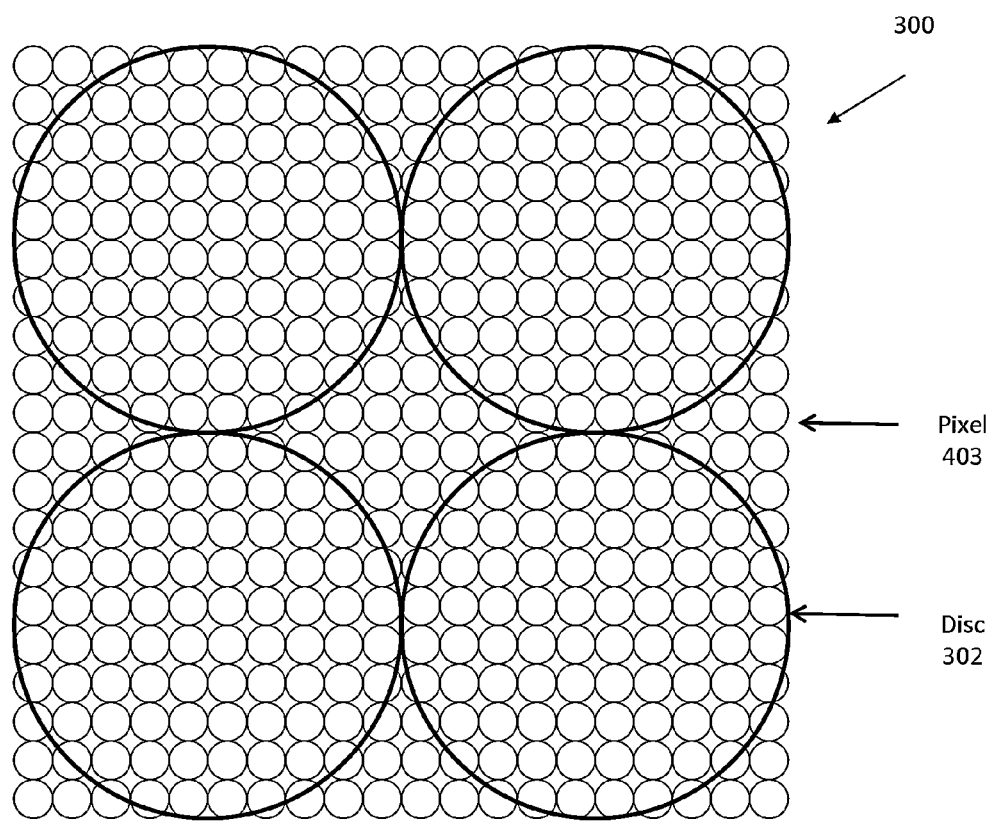
FIG. 3 depicts a portion of a light field image.

Referring now to FIG. 3, there is shown an example of a 2-disk by 2-disk portion 300 of such a light field image, including depictions of disks 302 and individual pixels 403; for illustrative purposes, each disk 302 is ten pixels 403 across. Many light rays in the light field within a light field camera contribute to the illumination of a single pixel 403.

Figure 4:
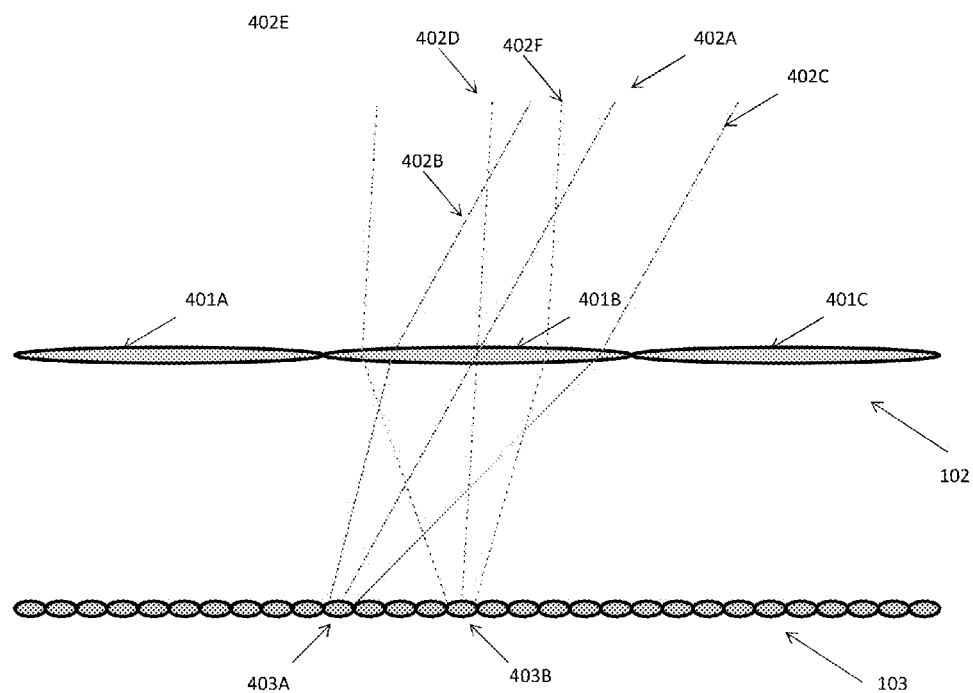
FIG. 4 depicts transmission of light rays through a microlens to illuminate pixels in a digital sensor.

Referring now to FIG. 4, there is shown an example of transmission of light rays 402, including representative rays 402A, 402D, through microlens 401B of the microlens array 102, to illuminate sensor pixels 403A, 403B in sensor 103. In the example of FIG. 4, rays 402A, 402B, 402C (represented by solid lines) illuminate sensor pixel 403A, while dashed rays 402D, 402E, 402F illuminate sensor pixel 403B. The value at each sensor pixel 403 is determined by the sum of the irradiance of all rays 402 that illuminate it. For illustrative and descriptive purposes, however, it may be useful to identify a single geometric ray 402 with each sensor pixel 403. That ray 402 may be chosen to be representative of all the rays 402 that illuminate that sensor pixel 403, and is therefore referred to herein as a representative ray 402. Such representative rays 402 may be chosen as those that pass through the center of a particular microlens 401, and that illuminate the center of a particular sensor pixel 403. In the example of FIG. 4, rays 402A and 402D are depicted as representative rays; both rays 402A, 402D pass through the center of microlens 401B, with ray 402A representing all rays 402 that illuminate sensor pixel 403A and ray 402D representing all rays 402 that illuminate sensor pixel 403B.

There may be a one-to-one relationship between sensor pixels 403 and their representative rays 402. This relationship may be enforced by arranging the (apparent) size and position of main-lens aperture 112, relative to microlens array 102, such that images of aperture 112, as projected onto sensor 103, do not overlap.

Figure 5:
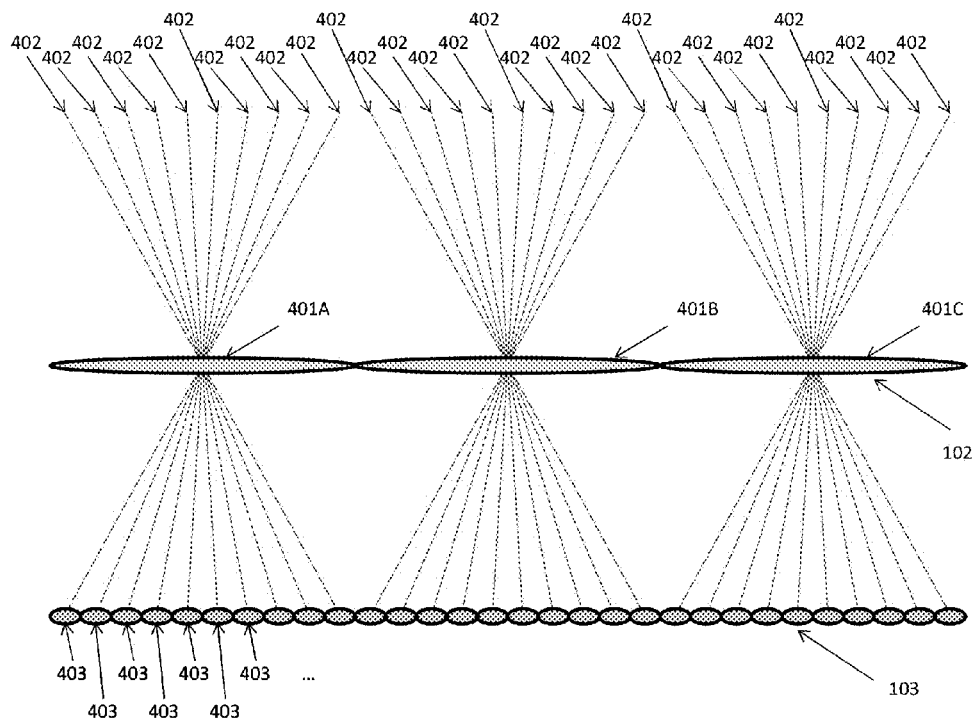
FIG. 5 depicts an arrangement of a light field capture device wherein a microlens array is positioned such that images of a main-lens aperture, as projected onto the digital sensor, do not overlap.

Referring now to FIG. 5, there is shown an example of an arrangement of a light field capture device, such as camera 100, wherein microlens array 102 is positioned such that images of a main-lens aperture 112, as projected onto sensor 103, do not overlap. All rays 402 depicted in FIG. 5 are representative rays 402, as they all pass through the center of one of microlenses 401 to the center of a pixel 403 of sensor 103.

In at least one embodiment, the four-dimensional light field representation may be reduced to a two-dimensional image through a process of projection and reconstruction.

Figure 6:
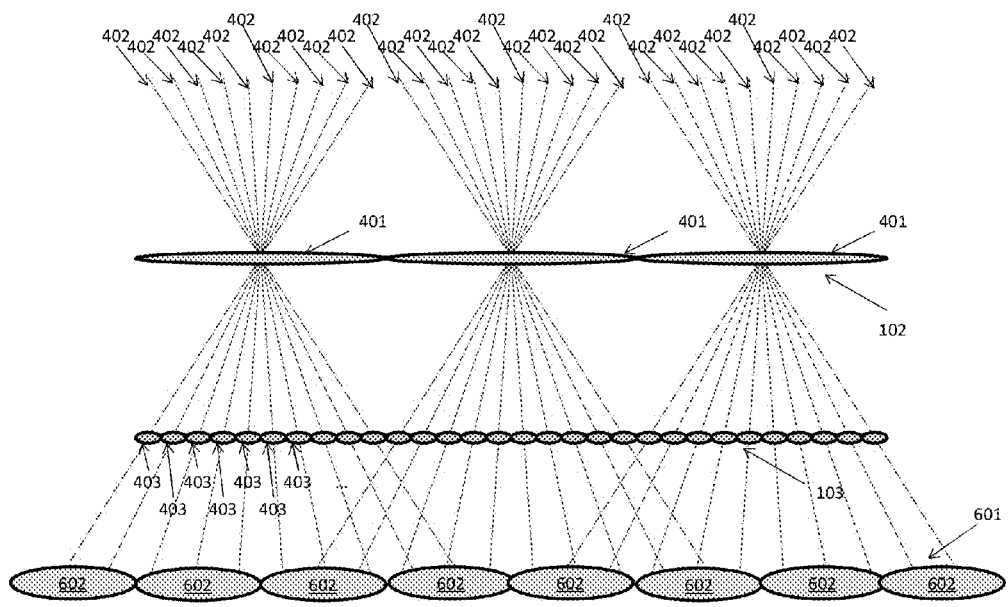
FIG. 6 depicts an example of projection and reconstruction to reduce a four-dimensional light field representation to a two-dimensional image.

Referring now to FIG. 6, there is shown an example of such a process. A virtual surface of projection 601 may be introduced, and the intersection of each representative ray 402 with surface 601 may be computed. Surface 601 may be planar or non-planar. If planar, it may be parallel to microlens array 102 and sensor 103, or it may not be parallel. In general, surface 601 may be positioned at any arbitrary location with respect to microlens array 102 and sensor 103. The color of each representative ray 402 may be taken to be equal to the color of its corresponding pixel. In at least one embodiment, pixels 403 of sensor 103 may include filters arranged in a regular pattern, such as a Bayer pattern, and converted to full-color pixels. Such conversion can take place prior to projection, so that projected rays 402 can be reconstructed without differentiation. Alternatively, separate reconstruction can be performed for each color channel.

The color of an image pixel 602 on projection surface 601 may be computed by summing the colors of representative rays 402 that intersect projection surface 601 within the domain of that image pixel 602. The domain may be within the boundary of the image pixel 602, or may extend beyond the boundary of the image pixel 602. The summation may be weighted, such that different representative rays 402 contribute different fractions to the sum. Ray weights may be assigned, for example, as a function of the location of the intersection between ray 402 and surface 601, relative to the center of a particular pixel 602. Any suitable weighting algorithm can be used, including for example a bilinear weighting algorithm, a bicubic weighting algorithm and/or a Gaussian weighting algorithm.

Method

In at least one embodiment, a depth estimation method operates by analyzing the depth of strong edges within the light field image, thus providing improved reliability of depth information while reducing or minimizing the amount of computation involved in generating such information.

In at least one embodiment, strong edges are identified and analyzed as follows. The light field data (initially represented as 4D values x,y,u,v) is rearranged into an array of epipolar images, or EPIs, consisting of the x/u slice of the light field data at each y, or the y/v slice of the light field data at each x. Then, for each pixel in the EPI, a local gradient is calculated. If the magnitude of the local gradient exceeds a predefined threshold, depth can be reliably estimated from the gradient; therefore, the orientation of the gradient is used to determine the depth of the corresponding element of the scene.

A depth map is then generated from the determined depths of various areas of the light field image. The depth map can then be used as a basis for any suitable form of output, such as in a user interface for providing information and feedback to aid a user in capturing light-field images, as depicted and described in the above-referenced related U.S. Utility application.

Figure 7A:
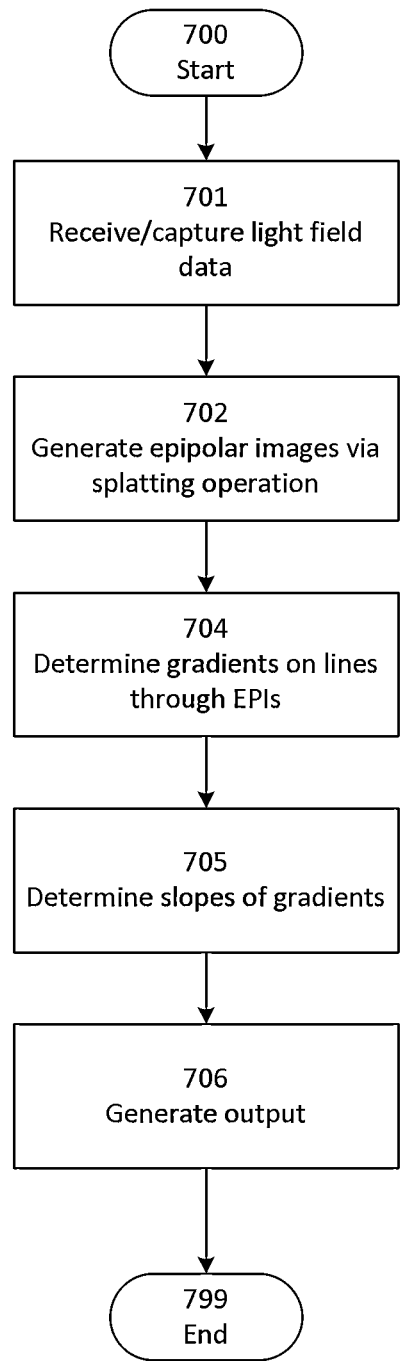
FIG. 7A is a flow diagram depicting an overall method for determining depth for a light field image, according to one embodiment.

Referring now to FIG. 7A, there is shown a flow diagram depicting an overall method for determining depth for a light field image, according to one embodiment. The method of FIG. 7A can be performed on any suitable device, including for example a camera 100 having an architecture as described above in connection with FIG. 1A, or a post-processing device 115 having an architecture as described above in connection with FIG. 1B.

The method begins 700. Light field data is received or captured 701, for example from image capture apparatus at camera 101 or from a storage device. A splatting operation is performed 702 on the light field data, whereby regularly sampled (x,u) and (y,v) slices, referred to as epipolar images (EPIs), are generated from the received light field data. Each EPI is an (x,u) slice of the light field at a particular value of y, or a (y,v) slice at each x. Local gradients are then determined 704 for pixels in the EPIs; this can be done for all pixels or for some subset of pixels, such as those pixels located in a central region of each EPI. If the local gradient has a magnitude that is larger than a threshold, the orientation (slope) of the gradient can be used as a reliable indicator of depth. Thus, for at least those gradients having sufficiently large magnitude, the slopes of those gradients are then determined 705, which yields a measure of depth at particular pixel locations in the image. Based on this determination, appropriate output is generated 706, for example to provide depth feedback to the user. Such output can include, for example, a depth map and/or a confidence map. The method ends 799.

Figure 7B:
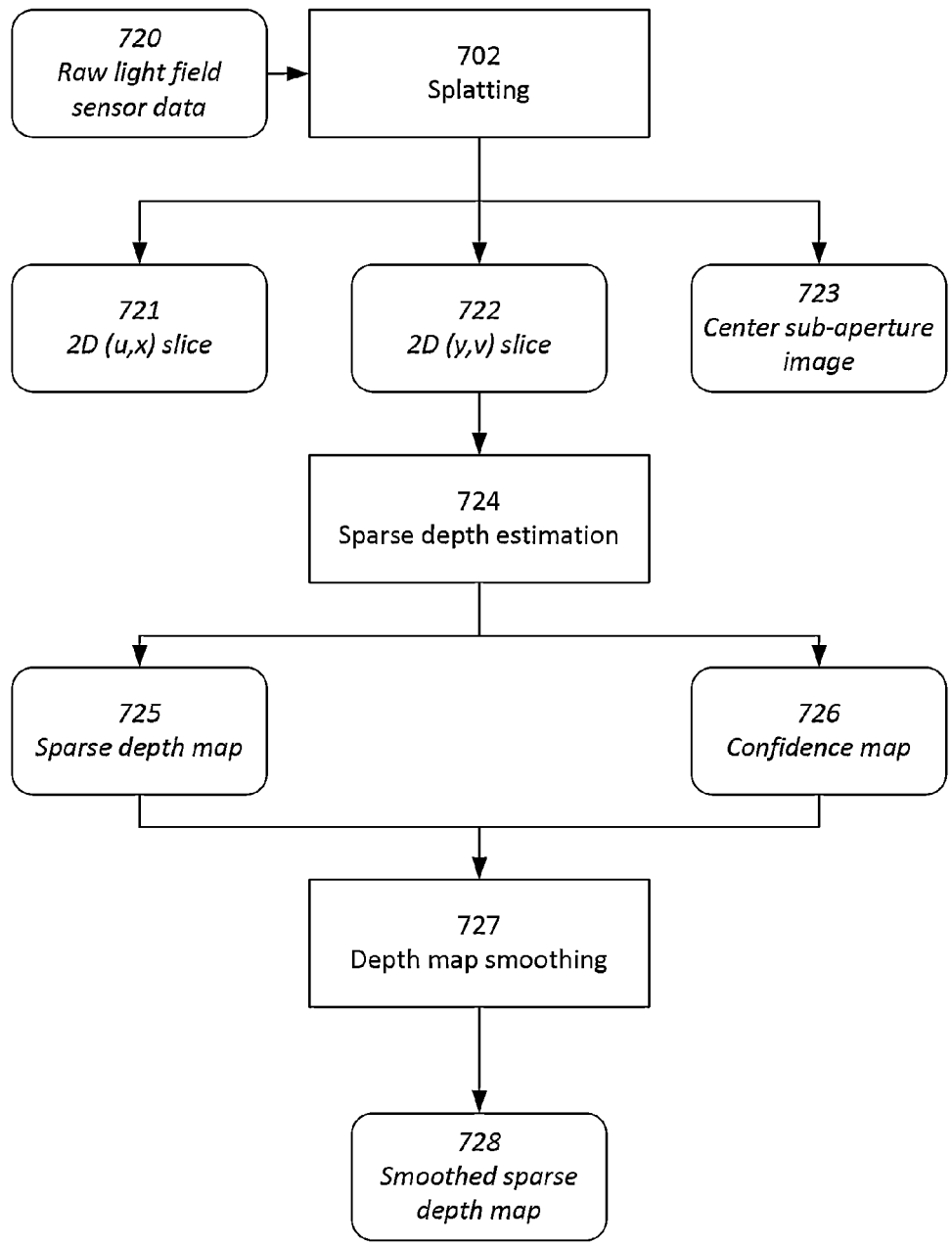
FIG. 7B is a diagram depicting a process flow for determining depth for a light field image, according to one embodiment.
Figure 8:
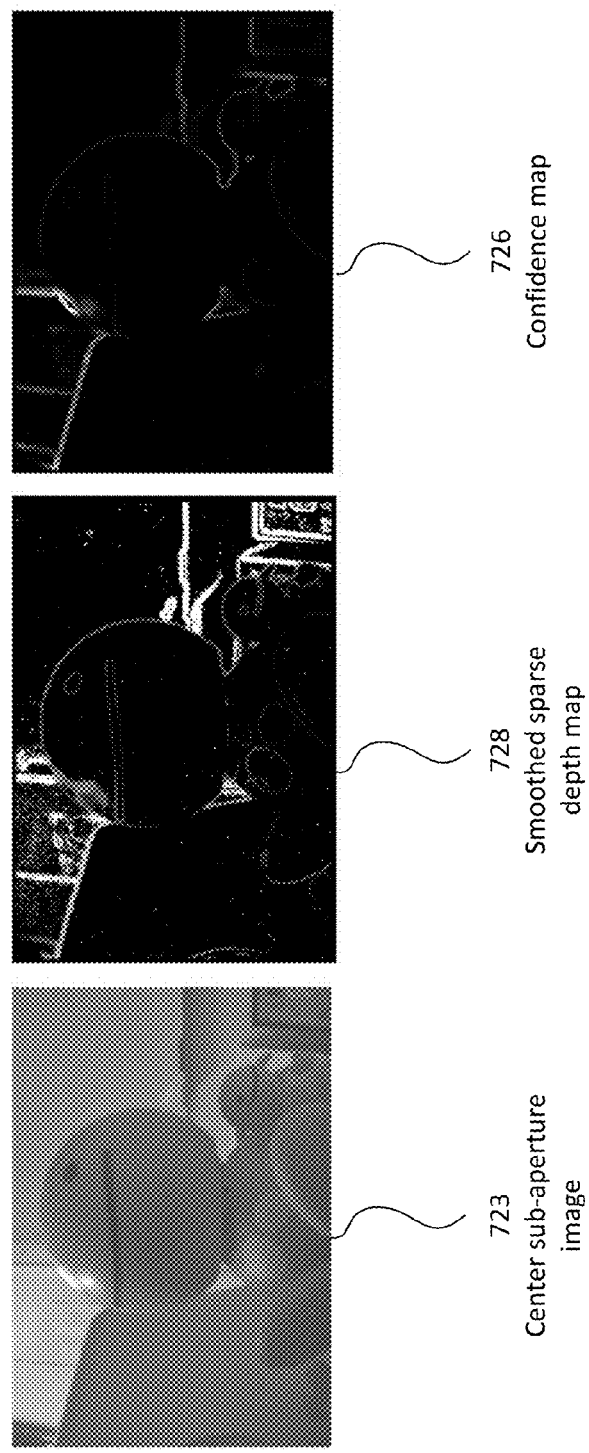
FIG. 8 depicts examples of various types of output generated by a system according to one embodiment.

Referring now to FIG. 7B, there is shown a diagram depicting a process flow for determining depth for a light field image, according to one embodiment. The process flow includes three stages: splatting 702, sparse depth estimation 724, and depth map smoothing 727. Splatting 702 takes as its input raw light field sensor data 720, for example from image capture apparatus at camera 101 or from a storage device, and generates two-dimensional (x,u) and (y,v) slices 721, 722, as well as center sub-aperture image 723. Sparse depth estimation 724 uses slices 721, 722 to generate sparse depth map 728 and confidence map 726. In at least one embodiment, depth map smoothing 727 is performed on sparse depth map 728 and confidence map 726 to generate smoothed sparse depth map 728.

In at least one embodiment, the output of the process flow includes center sub-aperture image 723 that can be used for visualization, as well as smoothed sparse depth map 728 and its confidence map 726 that can be used for depth-aware applications. Referring now also to FIG. 2, there is shown a set of examples of sub-aperture image 723, smoothed sparse depth map 728, and confidence map 726. Smooth sparse depth map 728 indicates depths of objects in the scene; in the example, darker areas represent objects that are closer to the camera. Confidence map 726 indicates a degree of confidence in the determined depths for various regions of the image, based for example on gradient magnitudes, as described in more detail herein.

Depth Determination Using Slope of (x,u) and (y,v) Slices

Figure 9:
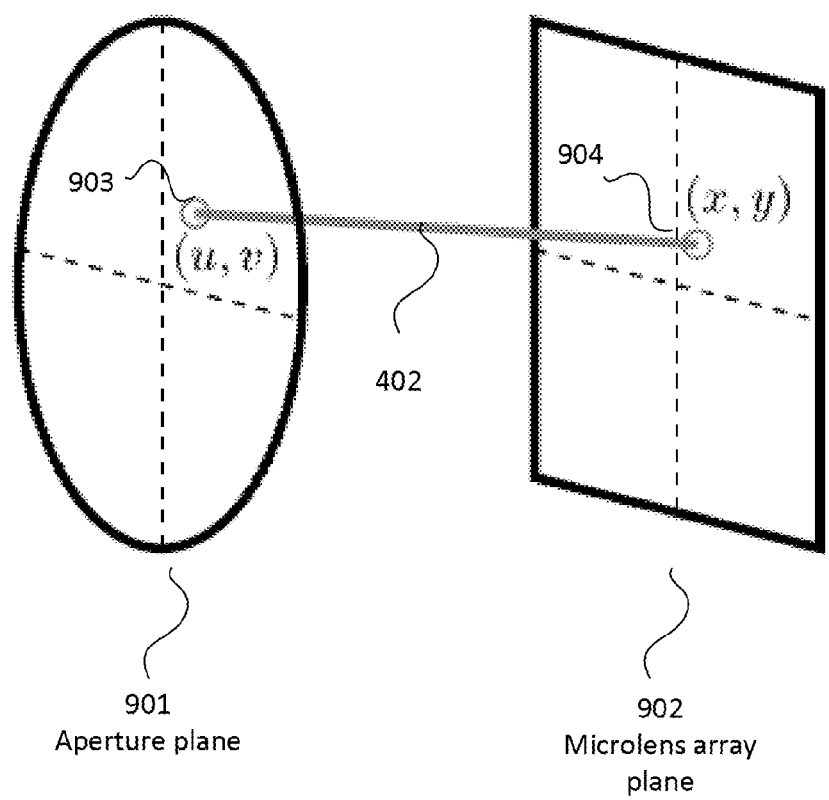
FIG. 9 depicts an example of a 4D light field representation for image data acquired by a light field camera, showing a relationship between the aperture plane and the microlens array plane, according to one embodiment.

Referring now to FIG. 9, there is shown an example of a 4D light field representation 900 for image data acquired by a light field camera 100, showing a relationship between aperture plane 901 (corresponding to aperture 112 of camera 100) and microlens array plane 902 (corresponding to microlens array 102 of camera 100), according to one embodiment. The light field records the full 4D ray space information of the scene, where each sample is parameterized by its intersections with the two reference planes 901, 902. In alternative embodiments, other reference planes can be used that need not correspond to aperture plane 901 and microlens array plane 902; however, for purposes of the description herein, reference planes corresponding to aperture plane 901 and microlens array plane 902 are assumed. For each light ray 402, (x,y) represents the coordinate of the intersection point 903 of the ray 402 on microlens array plane 902, and (u,v) represents the coordinate of the intersection point 904 of the ray 402 on aperture plane 901. The entire light field can be represented as a 4D function: $L(x,y,u,v)$.

Figure 10:
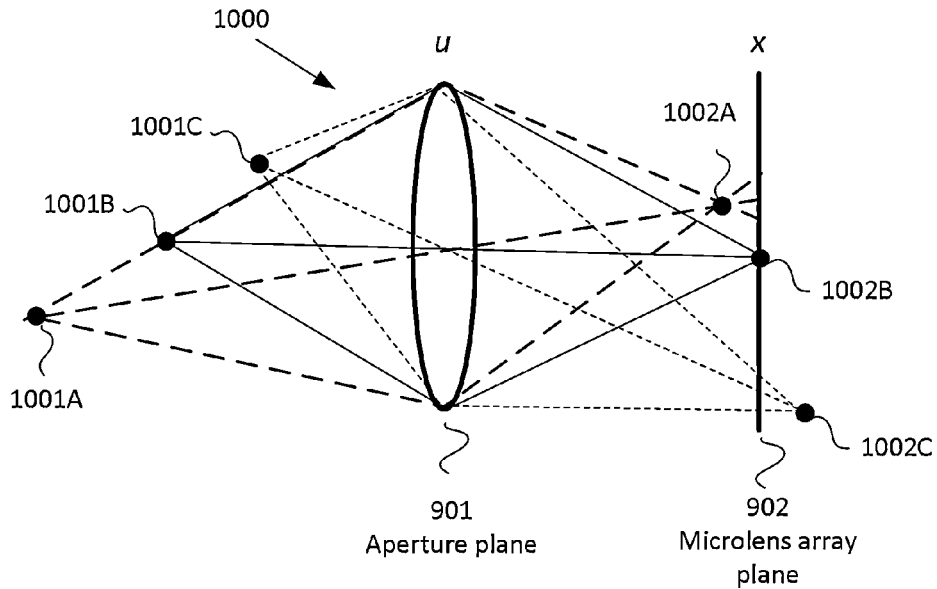
FIG. 10 is a top view depicting an example of 4D light field representation for image data acquired by a light field camera, showing a relationship between the aperture plane and the microlens array plane, with examples of three point objects in the scene, according to one embodiment.

The structure of the light field is highly correlated to the scene geometry. Referring now to FIG. 10, there is shown a top view depicting an example of 4D light field representation 1000 for image data acquired by light field camera 100, again showing the relationship between aperture plane 901 and microlens array plane 902, with examples of three point objects 1001A, 1001B, 1001C in the scene at different distances from the aperture of the light field camera 100, according to one embodiment. The three point objects 1001A, 1001B, 1001C correspond to three different convergence points 1002A, 1002B, 1002C. Because of the different distances of the three point objects 1001A, 1001B, 1001C, the convergence points 1002A, 1002B, 1002C are at different depths with respect to microlens array plane 902, as follows:

- Convergence point 1002A, corresponding to object 1001A being farther from camera 100, is located in front of plane 902;
- Convergence point 1002B, corresponding to object 1001B having medium distance from camera 100, is located directly on plane 902; and
- Convergence point 1002C, corresponding to object 1001C being closer to camera 100, is located in front of plane 902.

Referring also to FIG. 11, there is shown an example of an (x,u) slice 721 of the light field as seen at microlens array plane 902, wherein y and v are fixed to specific values. FIG. 11 plots u against x for each of the three point objects 1001A, 1001A, 1001C in FIG. 10, yielding three lines 1101A, 1101B, 1101C, respectively. The slope of each line 1101A, 1101B, 1101C in (x,u) slice 721 depends on the distance of corresponding objects 1001A, 1001A, 1001C. Specifically, in the depicted example:

- Line 1101A, corresponding to object 1001A being farther from camera 100, has negative slope, since, as can be seen from FIG. 10, light rays that intersect at higher u values on aperture plane 901 intersect at lower x values on microlens array plane 902 and vice versa;
- Line 1101B, corresponding to object 1001B being at medium distance from camera 100, is vertical, since, as can be seen from FIG. 10, all light rays intersect at the same point on microlens array plane 902 (same x value) regardless of where they intersect aperture plane 901;
- Line 1101C, corresponding to object 1001C being closer to camera 100, has positive slope, since, as can be seen from FIG. 10, light rays that intersect at higher u values on aperture plane 901 intersect at higher x values on microlens array plane 902, while light rays that intersect at lower u values on aperture plane 901 intersect at lower x values on microlens array plane 902.

In short, the differences in slopes for the three lines 1101A, 1101B, 1101C of FIG. 11 result from the different depths of convergence points 1002A, 1002B, 1002C, which in turn result from the different distances of objects 1001A, 1001B, 1001C. From this observation, it can be seen that the slope of any line 1101 in the (x,u) slice 721 is an indicator of the distance (depth) of a corresponding object 1001. A similar observation can be made for a (y,v) slice. Accordingly, in at least one embodiment, the described techniques of generating (x,u) and (y,v) slices 721, 722 and computing slopes of line features slices 721, 722 provides an effective method for quickly estimating depth of objects in the scene.

Accordingly, in at least one embodiment, the system obtains depths of the entire scene by generating and analyzing a number of (x,u) slices at different y's, and a number of (y,v) slices at different x's. The v value for the (x,u) slices (or the u value for the (y,v) slices) can be chosen arbitrarily. In at least one embodiment, v is chosen to be zero for the (x,u) slices, and u is chosen to be zero for the (y,v) slices. The samples in this setting are closer to the center of aperture plane 901 and have higher signal-to-noise ratio than those near the edges of aperture plane 901.

Splatting 702

One issue that may arise with the above-described approach is that the light fields captured by light field camera 100 may not have a regular sampling pattern. In other words, the mapping from a sample with sensor coordinate (s,t) to its 4D coordinate (x,y,u,v) may not be trivial and may be expensive (time-consuming and/or processor-intensive) to evaluate.

Accordingly, in at least one embodiment, a re-sampling process, referring to as "fast splatting" 702, is performed to map the input light field to the output and thereby generate regularly sampled (x,u) and (y,v) slices 721, 722.

Figure 11A:
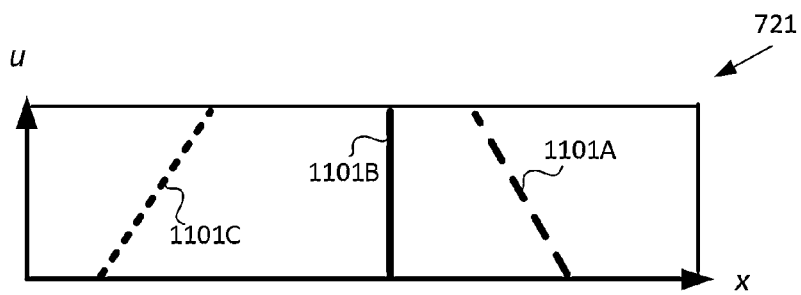
FIG. 11A depicts an example of an (x,u) slice corresponding to the example of FIG. 10, according to one embodiment.
Figure 11B:
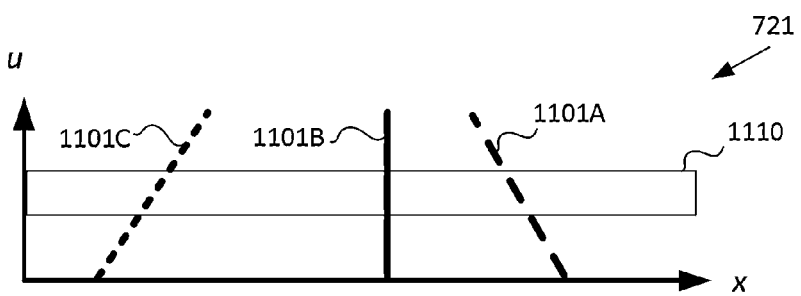
FIG. 11B depicts an example of an (x,u) slice with a bounding box, according to one embodiment.

Fast splatting 702 takes advantage of the fact that not need all samples in the (x,u) and (y,v) slices are needed to estimate the slopes of lines such as 1101A, 1101B, 1101C. Rather, slopes can be determined using only a few samples around u=0 and v=0. Referring now to FIG. 11B, there is shown the same (x,u) slice 721 as depicted in FIG. 11A, but with bounding box 1110 indicated, illustrating that slopes can be estimated using only a few samples around u=0 and v=0. Samples outside bounding box 1110 are not needed to determine slope. Therefore, in at least one embodiment, the system identifies the locations of light field samples with (u,v)=(0,0), which is equivalent to the centers of the microlens, on the sensor plane, so as to quickly generate the (subset of) (x,u) and (y,v) slices 721.

In at least one embodiment, the fast splatting method 702 takes as input the following:

Raw light field sensor data R
The sets of (u,v) coordinates of interest for (x,u) and (y,v) slices:
$A_h = \{u_i | i=1, 2, \ldots, N\}$ and $A_v = \{v_j | j=1, 2, \ldots, M\}$.
and generates as output the following:
$S_h(x,u,y)$ and $S_v(y,v,x)$ slices 721, 722; and
Center sub-aperture image 723 M(x,y).
(In at least one embodiment, the output slices 721, 722 are three dimensional so that a number of (x,u) slices are available for different y's, as described above).

In at least one embodiment, the fast splatting method 702 is performed using the following steps:

Calculate the offset vectors of coordinates in $A_{\{h,v\}}$, and store them in $D_h = \{(ds_i, dt_i) | i=1 \ldots N\}$ and $D_v = \{(ds_j, dt_j) | j=1 \ldots M\}$
Allocate two weight buffers $W_h$ and $W_v$, matching the size of $S_h$ and $S_v$, respectively.
Set all samples in $W_h$, $W_v$, $S_h$ and $S_v$ to zero.
While true
  If (FindNextMicrolensCenter($s_0, t_0, x, y$)=false)
    Break
  For each $(ds_i, dt_i) \in D_h$
    $r \leftarrow$ sample($R, s_0 + ds_i, t + dt_i$)
    splat($r, S_h, W_h, x, u_i, y$)
  For each $(ds_j, dt_j) \in D_v$
    $r \leftarrow$ sample($R, s_0 + ds_j, t + dt_j$)
    splat($r, S_v, W_v, y, v_j, x$)
For each sample (x,u,y) in $S_h$
  If ($W_h(x,u,y) > 0$)
    $S_h(x,u,y) = S_h(x,u,y) / W_h(x,u,y)$
For each sample (y,v,x) in $S_v$
  If ($W_v(y,v,x) > 0$)
    $S_v(y,v,x) = S_v(y,v,x) / W_v(y,v,x)$ "Offset vectors" refer to the distance of each desired (u,v) coordinate to be sampled to the center of the microlens on the sensor domain. In at least one embodiment, these offset vectors can be obtained by camera 100 calibration.

In each iteration of the above-depicted while loop, the system attempts to find the center of the next non-visited microlens using the function FindNextMicrolensCenter, and stores the center sensor and light field coordinates to $(s_0,t_0)$ and (x,y,0, 0) ((u,v) is zero for the center of the microlens), respectively. There are many ways to efficiently perform this function. In at least one embodiment, the attempts pre-computes all possible centers and stores them in a look-up table. Alternatively, if the microlens center in the previous iteration has been stored, and microlens array 102 is arranged in some predictable way, the center of the current microlens can be easily derived.

After a new $(s_0, t_0)$ is found, the system uses the offset vectors to find the locations to sample on sensor 103. The sample function performs the simple average, and return an intensity value r. The system then splats r into the slice by function splat, and increases the corresponding weight in the weight buffer. After performing these steps for all microlens centers, the system normalizes the slices by the weight values in the weight tables.

In practice, in at least one embodiment, only three samples are determined for each slice (N=M=3). In at least one embodiment, some small filters are used in sample and splat to make the result smooth. Also, some coordinate scaling and/or offset can be applied in sample and splat to match the size of the output buffers.

Figure 12:
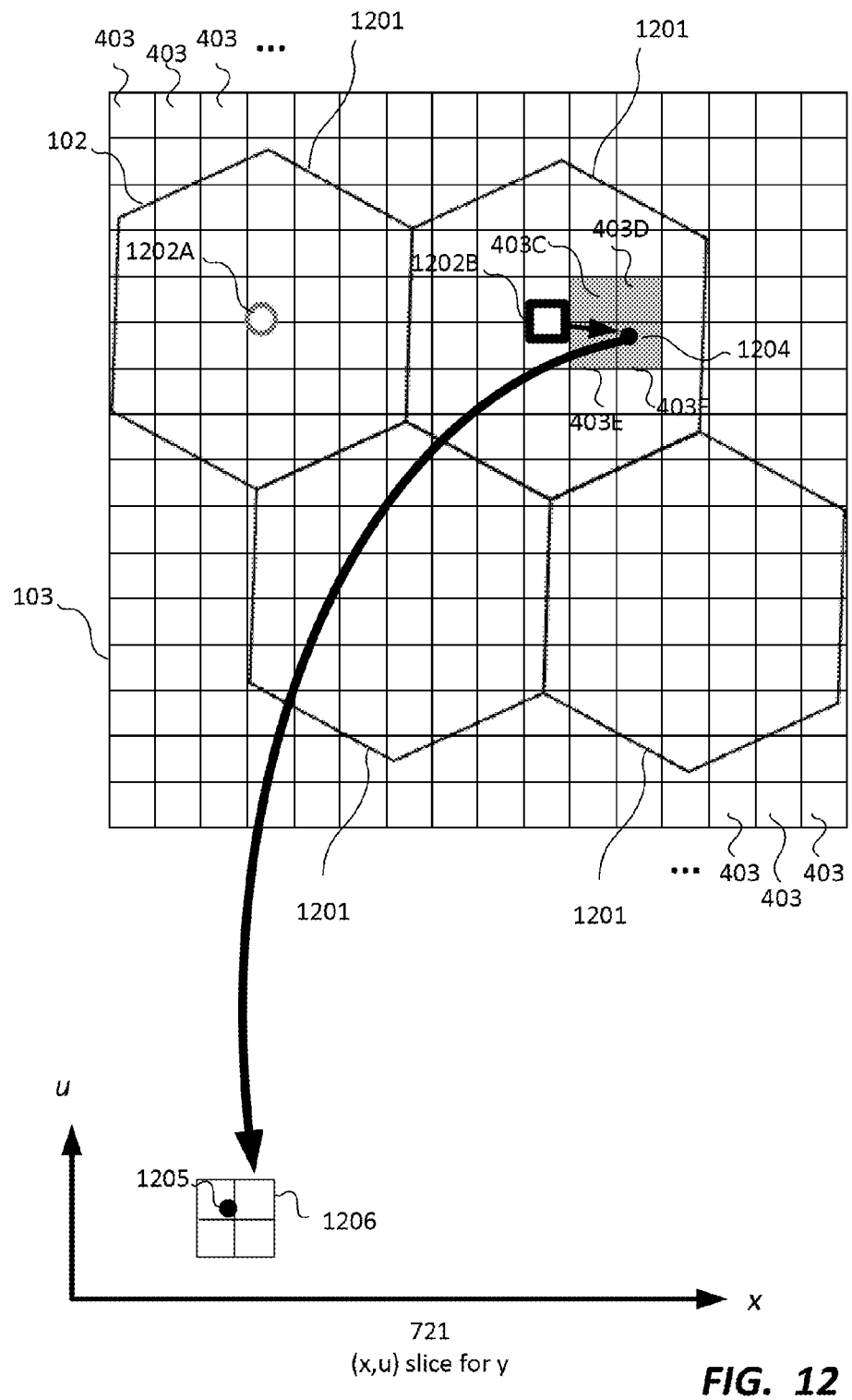
FIG. 12 depicts an example of a fast-splatting process for a microlens array having hexagonal tiling and a photosensor array having square tiling, according to one embodiment.

Referring now to FIG. 12, there is shown an example of processing according to the above-described steps. In this example, microlens array 102 is in hexagonal tiling and photosensor array 103 is in square tilting. For clarity, FIG. 12 only shows four microlens elements 1201 (equivalent to disks 302 shown in FIG. 3) and the sensor pixels 403 around them. For illustrative purposes, in this example, only one sample 1206 is being generated (N=1, M=0).

In this example, the microlens center 1202A from the previous iteration is used to find the center 1202B of the current microlens 1201 (using FindNextMicrolensCenter). This location has a sensor coordinate of $(s_0,t_0)$ and a light field coordinate of (x,y,0,0). Then, $(ds_1, dt_1)$ is used to find the location 1204 to perform sample. This location has a sensor coordinate of $(s_0+ds_1, t_0+dt_1)$ and a light field coordinate of $(x,y,u_1,0)$. Intensity values for sensor pixels 403 near this location 1203 are combined; in this case, intensity values for four nearby sensor pixels 403C, 403D, 403E, 403F are combined. Next, the appropriate target location 1205 for slice 721 in the output buffers $S_h(x,u,y)$ is determined, and the values for samples 1206 around target location 1205 are updated using the splat function.

Figure 13:
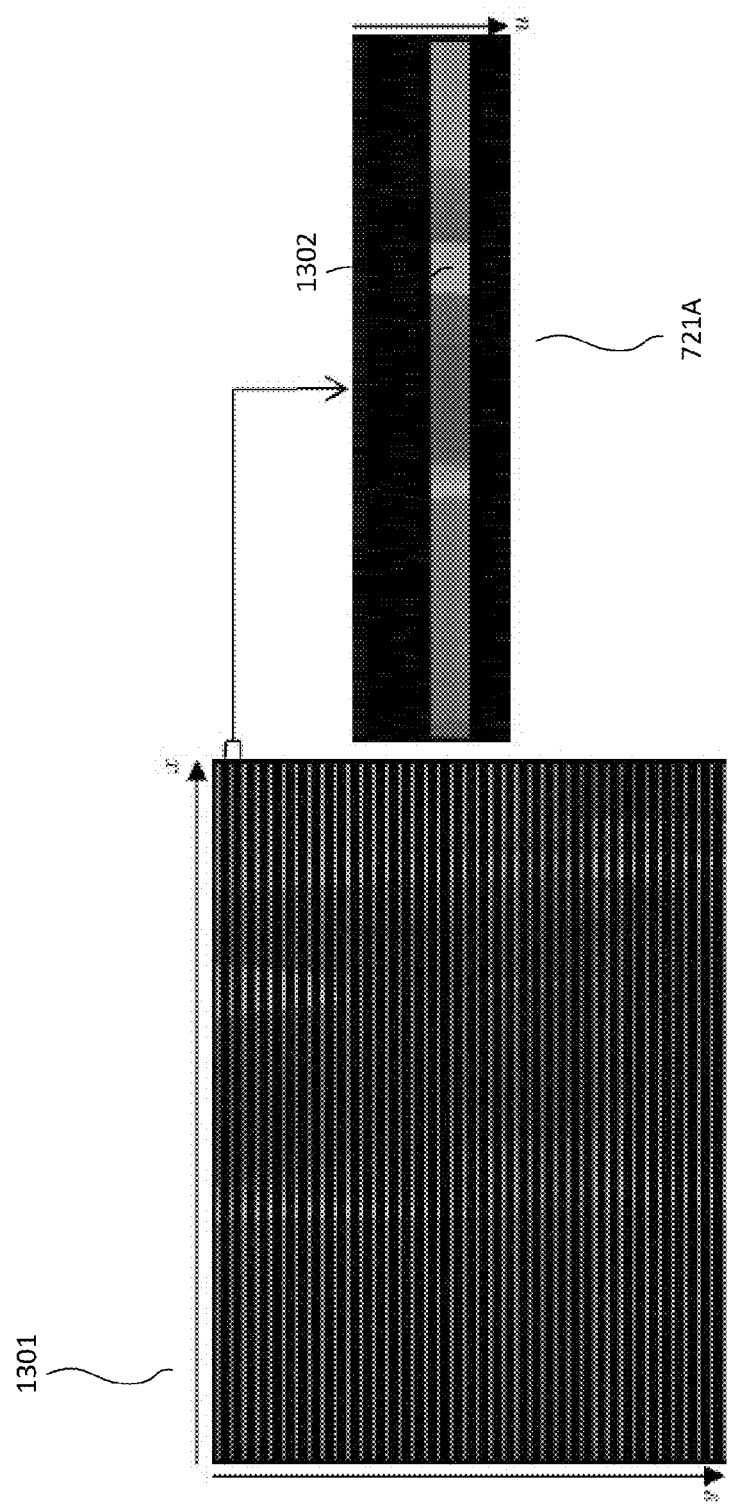
FIG. 13 depicts an example of output of a fast-splatting process according to one embodiment.

Referring now to FIG. 13, there is shown an example of output $S_h(x,u,y)$ of a fast splatting process according to one embodiment. Image segment 1301 is a crop of $S_h(x,u,y)$. Also shown is an (x,u) slice 721A for a specific y. Line features 1302 in slice 721A have different slopes, which is the property that is used for depth estimation according to the techniques described herein. As can be seen in the example of FIG. 13, in at least one embodiment, only a small subset of slice 721A is generated, leaving other regions blank.

In at least one embodiment, the system iterates through all microlenses 1201 (or disks 302), but need not iterate through all 4D samples, thus saving considerable processing load. In addition, in at least one embodiment, 4D coordinates for the samples need not be computed, as most of them can be easily inferred from small pre-computed tables.

Sparse Depth Estimation 724

Once slices 721, 722 have been generated using the splatting method 702 described above, the system uses a sparse depth estimation method 724 to determine the slopes of the line features in them, which slopes are then used as an indicator of depth of objects in the scene. First, the system computes gradient vectors in slices 721, 722. The gradient is a local estimate of the rate of change of signal along each dimension. Since each slice 721, 722 is a two-dimensional signal, the gradient has two components. As described in more detail below, the slope of the gradient is mapped to depth value, and the magnitude of the gradient is used as a confidence measurement.

In at least one embodiment, the sparse depth estimation method 724 takes as input the following:
$S_h(x,u,y)$ and $S_v(y,v,x)$ slices.
Confidence threshold $T_c$
Slope-to-depth mapping function $f( )$
and generates as output the following:
Depth map D(x,y) and confidence map C(x,y)
In at least one embodiment, the sparse depth estimation method 724 is performed using the following steps:
For each (x,y)
    Compute gradients $g_h(x,y)$ and $g_v(x,y)$ at $S_h(x,0,y)$ and $S_v(y,0,x)$, respectively
    If $(|g_h(x,y)|>|g_v(x,y)|)$
        $c=|g_h(x,y)|, s=g_h(x,y)[0]/g_h(x,y)[1]$
    Else
        $c=|g_v(x,y)|, s=g_v(x,y)[0]/g_v(x,y)[1]$
    If $(c>T_c)$
        C(x,y)=c
        D(x,y)=$f(g)$
    Else
        C(x,y)=0

Any suitable technique can be used for computing the gradient. One example of a known technique is a Sober filter, which takes six samples surrounding (x,y):
$g_h(x,y)[0]=S_h(x+1,-1,y)+2S_h(x+1,0,y)+S_h(x+1,1,y)-S_h(x-1,-1,y)-2S_h(x-1,0,y)-S_h(x-1,1,y)$,
$g_h(x,y)[1]=S_h(x-1,1,y)+2S_h(x,1,y)+S_h(x+1,1,y)-S_h(x-1,-1,y)-2S_h(x,-1,y)-S_h(x+1,-1,y)$, The slope of the gradient is defined as the ratio between two components of the gradient vector. Once the slope has been determined, it can be mapped to the depth value. In at least one embodiment, the mapping function is performed using a simple look-up table that can depend on camera configuration and/or any other suitable factors.

Because the gradient measurements are reliable only when the edge is strong, in at least one embodiment the magnitude of the gradient is used as a confidence measurement; thus, in at least one embodiment, the depth value is only calculated when the confidence is above certain threshold.

Figure 14:
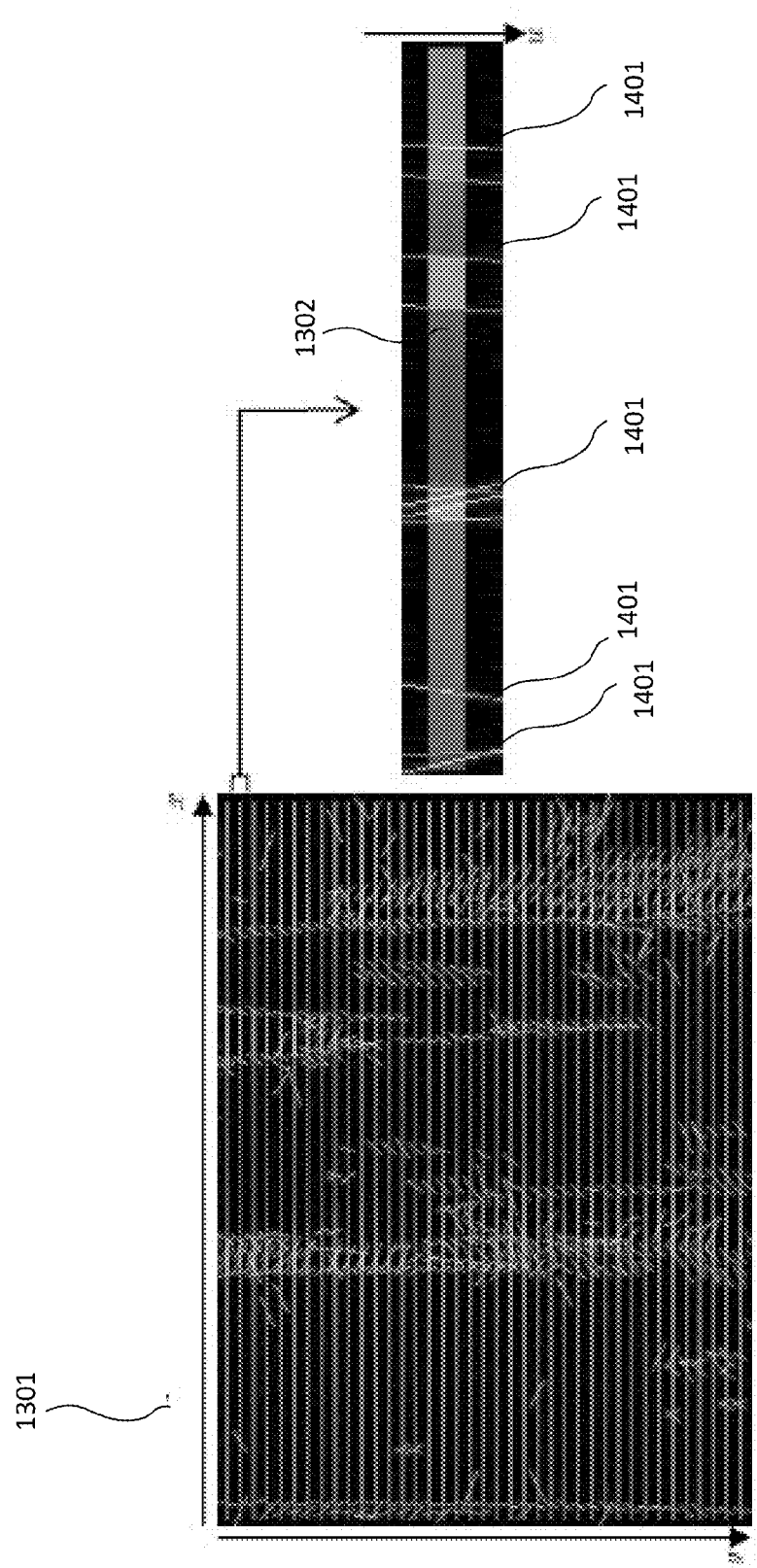
FIG. 14 depicts an example of output including slope estimates, according to one embodiment.

Referring now to FIG. 14, there is shown an example of output including slope estimates, according to one embodiment, which represents application of the above-described method on the results shown in FIG. 13. The slope estimates are overlaid on slice 1302 as thin lines 1401, so as to emphasize edge features of slice 1302.

Depth Map Smoothing 727

As can be seen from the example of FIG. 14, in some situations, the output of the depth estimation method 724 can be noisy. In at least one embodiment, the system applies a smoothing method 727 to further improve results by removing this noise.

Because the depth map generated above is sparse, it may be difficult to apply traditional image filtering such as Gaussian or box filter, to smooth it. In at least one embodiment, confidence values are checking during the filtering process, and only those samples having confidence values above a specified threshold are used. During the processing, only the neighboring samples with non-zero confidence are used.

In at least one embodiment, the depth map smoothing method 727 takes as input the following:

Depth map D(x,y) and confidence map C(x,y)
Filter kernel function k
Process threshold T and generates as output the following:

Smoothed depth map $D_s(x,y)$ and confidence map $C_s(x,y)$

In at least one embodiment, the depth map smoothing method 727 is performed using the following steps:

For each (x,y)
   $S_d=\{0\}$
   If (C(x,y)=⁰)
     Continue
   For each (i,j) around (x,y)
     If (C(i,j)>T)
        $S_d=\{S_d,(D(i,j),C(i,j),x-i,y-j)\}$
   d=0, c=0, w=0
   For each (d',c',y') in $S_d$
     d=d+k(x',y')d', c=c+k(x',y')c', w=w+k(x',y')
   $D_s(x,y)=d/w$
   $C_s(x,y)=c/w$ For each target sample, the system first gathers all samples around with non-zero confidence into a sample set $S_d$. Each element in the set contains the depth value, the confidence value, and the offset from the target sample. Each sample is then assigned a weight, and the samples are combined together. The weight of each sample is determined by the input kernel function k. In at least one embodiment, the size of $S_d$ for each target can be different; accordingly, the combined value can be normalized by the total weights before assigning them to the output.

As described above, the final output of the system is, in at least one embodiment, a center sub-aperture image 723, smoothed sparse depth map 728, and confidence map 726. In other embodiments, the smoothing process can be omitted, and the system can output sparse depth map 725 instead of smoothed sparse depth map 728.

The output of the system can then be provided to a user, for example in the context of a user interface or visualization tool to assist the user in controlling the camera and positioning subjects at an appropriate depth range. In at least one embodiment, such output can be provided in a system as described in related U.S. Utility application Ser. No. 13/774,986 for "Light field Processing and Analysis, Camera Control, and User Interfaces and Interaction on Light field Capture Devices", filed on Feb. 22, 2013. However, one skilled in the art will recognize that the output of the techniques described herein can be stored, transmitted, displayed, and/or otherwise used in any suitable way. For example, a depth map can be generated from the determined depths of various areas of the light field image, and used as the basis for a color-coded display, wherein objects of different depths are highlighted in different colors; alternatively, other visual means can be used for distinguishing objects of different depths.

The above description and referenced drawings set forth particular details with respect to possible embodiments. Those of skill in the art will appreciate that other embodiments are possible. First, the particular naming of the components, capitalization of terms, the attributes, data structures, or any other programming or structural aspect is not mandatory or significant, and the mechanisms described herein may have different names, formats, or protocols. Further, the system may be implemented via a combination of hardware and software, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrases "in one embodiment" or "in at least one embodiment" in various places in the specification are not necessarily all referring to the same embodiment.

Some embodiments may include a system or a method for performing the above-described techniques, either singly or in any combination. Other embodiments may include a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" "calculating" calculating" "displaying" displaying" "determining" determining or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions can be embodied in software, firmware and/or hardware, and when embodied in software, can be downloaded to reside on and be operated from different platforms used by a variety of operating systems.

Some embodiments relate to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, DVD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the system and method set forth herein are not described with reference to any particular programming language. It will be appreciated that a variety of programming languages may be used to implement the teachings described herein, and any references above to specific languages are provided for illustrative purposes only.

Accordingly, various embodiments may include software, hardware, and/or other elements for controlling a computer system, computing device, or other electronic device, or any combination or plurality thereof. Such an electronic device can include, for example, a processor, an input device (such as a keyboard, mouse, touchpad, track pad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or non-portable. Examples of electronic devices that may be used include: a mobile phone, personal digital assistant, smartphone, kiosk, server computer, enterprise computing device, desktop computer, laptop computer, tablet computer, consumer electronic device, or the like. An electronic device for implementing the system or method described herein may use any operating system such as, for example and without limitation: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

While a limited number of embodiments has been described herein, those skilled in the art, having benefit of the above description, will appreciate that other embodiments may be devised which do not depart from the scope of the claims. In addition, it should be noted that the language used in the specification has been principally selected for readability and instructional purposes, and may not have been selected to delineate or circumscribe the inventive subject matter. Accordingly, this disclosure is intended to be illustrative, but not limiting.

What is claimed is:

1. A method for determining depth in a light field image comprising (x,y,u,v) four-dimensional data for pixels, comprising:
    at a processor, obtaining a light field image;
    at the processor, identifying a subset of light field samples in the light field image for generating epipolar images;
    at the processor, re-sampling the light field image to generate at least one epipolar image from the identified subset of light field samples, wherein each epipolar image comprises at least one selected from the group consisting of:
    a two-dimensional (x,u) slice for a fixed value of y; and a two-dimensional (y,v) slice for a fixed value of x;
    at the processor, determining at least one gradient for at least a portion of at least one generated epipolar image;
    at the processor, determining a slope for the at least one gradient;
    at the processor, based on the determined slope, determining a depth for at least one element of the light field image;
    at an output device, generating output representing the determined depth;
    wherein identifying a subset of light field samples in the light field image comprises identifying samples corresponding to approximate centers of microlenses used in capturing the light field image; and
    wherein identifying samples corresponding to approximate centers of microlenses used in capturing the light field image comprises, for each of a plurality of microlenses:
    determining offset vectors indicating a distance between a desired coordinate of a sample and a center of a corresponding microlens;
    determining a location of the microlens center; and
    based on the determined offset vector, identifying a plurality of pixel locations to sample.

2. The method of claim 1, further comprising, prior to determining a slope for the at least one gradient:
    at the processor, determining a magnitude for the at least one gradient; and
    at the processor, determining whether the magnitude for the at least one gradient exceeds a threshold;
    and wherein determining a slope for the at least one gradient is performed responsive to a determination that the magnitude for the at least one gradient exceeds the threshold.

3. The method of claim 1, wherein generating output representing the determined depth comprises:
    generating a depth map comprising visual indicators of depth for elements of a depicted scene; and
    displaying the depth map on a display screen.

4. The method of claim 1, wherein generating output representing the determined depth comprises generating a depth map comprising visual indicators of depth for elements of a depicted scene, the method further comprising:
    at the processor, determining a magnitude for the at least one gradient;
    at the processor, generating a confidence map based on the determined magnitude, the confidence map comprising visual indicators of confidence in the determined depth for elements of the depicted scene; and
    at the output device, outputting the confidence map.

5. The method of claim 1, wherein generating output representing the determined depth comprises:
    generating a depth map comprising visual indicators of depth for elements of a depicted scene;
    performing depth map smoothing to generate a smoothed depth map; and
    outputting the smoothed depth map.

6. The method of claim 1, further comprising, at the output device, displaying a projection of the light field image, and wherein generating output representing the determined depth comprises superimposing, on the displayed projection of the light field image, a depth map comprising visual indicators of depth for elements of a depicted scene.

7. The method of claim 1, further comprising: sampling the identified pixels; and performing weighted averaging to combine the samples to generate an intensity value for a position in one of the epipolar images.

8. A computer program product for determining depth in a light field image comprising (x,y,u,v) four-dimensional data for pixels, comprising:
   a non-transitory storage medium; and
   computer program code, encoded on the medium, configured to cause at least one processor to perform the steps of:
   obtaining a light field image;
   identifying a subset of light field samples in the light field image for generating epipolar images;
   re-sampling the light field image to generate at least one epipolar image from the identified subset of light field samples, wherein each epipolar image comprises at least one selected from the group consisting of:
   a two-dimensional (x,u) slice for a fixed value of y; and
   a two-dimensional (y,v) slice for a fixed value of x; determining at least one gradient for at least a portion of at least one generated epipolar image;
   determining a slope for the at least one gradient;
   based on the determined slope, determining a depth for at least one element of the light field image;
   causing an output device to generate output representing the determined depth;
   wherein the computer program code configured to cause the at least one processor to identify a subset of light field samples in the light field image comprises computer program code configured to cause the at least one processor to identify samples corresponding to approximate centers of microlenses used in capturing the light field image;
   wherein the computer program code configured to cause the at least one processor to identify samples corresponding to approximate centers of microlenses used in capturing the light field image comprises computer program code configured to cause the at least one processor to, for each of a plurality of microlenses:
   determine offset vectors indicating a distance between a desired coordinate of a sample and a center of a corresponding microlens;
   determine a location of the microlens center; and
   based on the determined offset vector, identify a plurality of pixel locations to sample.

9. The computer program product of claim 8, further comprising computer program code configured to cause the at least one processor to, prior to determining a slope for the at least one gradient:
   determine a magnitude for the at least one gradient; and
   determine whether the magnitude for the at least one gradient exceeds a threshold;
   and wherein the computer program code configured to cause the at least one processor to determine a slope for the at least one gradient comprises computer program code configured to cause the at least one processor to determine the slope for the at least one gradient responsive to a determination that the magnitude for the at least one gradient exceeds the threshold.

10. The computer program product of claim 8, wherein the computer program code configured to cause the output device to generate output representing the determined depth comprises computer program code configured to cause the output device to:
   generate a depth map comprising visual indicators of depth for elements of a depicted scene; and
   display the depth map on a display screen.

11. The computer program product of claim 8, wherein the computer program code configured to cause the output device to generate output representing the determined depth comprises computer program code configured to cause the output device to generate a depth map comprising visual indicators of depth for elements of a depicted scene, the computer program product further comprising computer program code configured to cause the at least one processor to perform the steps of:
   determining a magnitude for the at least one gradient;
   generating a confidence map based on the determined magnitude, the confidence map comprising visual indicators of confidence in the determined depth for elements of the depicted scene; and
   causing the output device to output the confidence map.

12. The computer program product of claim 8, wherein the computer program code configured to cause the output device to generate output representing the determined depth comprises:
   computer program code configured to cause the at least one processor to generate a depth map comprising visual indicators of depth for elements of a depicted scene;
   computer program code configured to cause the at least one processor to perform depth map smoothing to generate a smoothed depth map; and
   computer program code configured to cause the output device to output the smoothed depth map.

13. The computer program product of claim 8, further comprising computer program code configured to cause the output device to display a projection of the light field image;
   and wherein the computer program code configured to cause the output device to generate output representing the determined depth comprises computer program code configured to cause the output device to superimpose, on the displayed projection of the light field image, a depth map comprising visual indicators of depth for elements of a depicted scene.

14. The computer program product of claim 8, further comprising computer program code configured to cause the at least one processor to:
   sample the identified pixels; and
   perform weighted averaging to combine the samples to generate an intensity value for a position in one of the epipolar images.

15. A system for determining depth in a light field image comprising (x,y,u,v) four-dimensional data for pixels, comprising: an optical assembly, configured to obtain a light field image;
   at least one processor, communicatively coupled to the optical assembly, configured to:
   identify a subset of light field samples in the light field image for generating epipolar images;
   re-sample the light field image to generate at least one epipolar image from the identified subset of light field samples, wherein each epipolar image comprises at least one selected from the group consisting of: a two-dimensional (x,u) slice for a fixed value of y; and a two-dimensional (y,v) slice for a fixed value of x;
   determine at least one gradient for at least a portion of at least one generated epipolar image;
   determine a slope for the at least one gradient; and based on the determined slope, determining a depth for at least one element of the light field image;
an output device, communicatively coupled to the at least one processor, configured to generate output representing the determined depth;
wherein the at least one processor is configured to identify a subset of light field samples in the light field image by identifying samples corresponding to approximate centers of microlenses used in capturing the light field image;
wherein the at least one processor is configured to identify samples corresponding to approximate centers of microlenses used in capturing the light field image by, for each of a plurality of microlenses:
determining offset vectors indicating a distance between a desired coordinate of a sample and a center of a corresponding microlens; determining a location of the microlens center; and based on the determined offset vector, identifying a plurality of pixel locations to sample.

16. The system of claim 15, wherein the at least one processor is further configured to, prior to determining a slope for the at least one gradient:
determine a magnitude for the at least one gradient; and
determine whether the magnitude for the at least one gradient exceeds a threshold;
and wherein the at least one processor is configured to determine a slope for the at least one gradient responsive to a determination that the magnitude for the at least one gradient exceeds the threshold.

17. The system of claim 15, wherein the output device is configured to generate output representing the determined depth by:
generating a depth map comprising visual indicators of depth for elements of a depicted scene; and
displaying the depth map on a display screen.

18. The system of claim 15, wherein the at least one processor is further configured to:
determine a magnitude for the at least one gradient; and
generate a confidence map based on the determined magnitude, the confidence map comprising visual indicators of confidence in the determined depth for elements of the depicted scene;
and wherein the output device is configured to generate output representing the determined depth by generating a depth map comprising visual indicators of depth for elements of a depicted scene;
and wherein the output device is further configured to output the confidence map.

19. The system of claim 15, wherein the output device is configured to generate output representing the determined depth by:
generating a depth map comprising visual indicators of depth for elements of a depicted scene;
performing depth map smoothing to generate a smoothed depth map; and
outputting the smoothed depth map.

20. The system of claim 15, wherein the output device is further configured to display a projection of the light field image;
and wherein the output device is configured to generate output representing the determined depth by superimposing, on the displayed projection of the light field image, a depth map comprising visual indicators of depth for elements of a depicted scene.

21. The system of claim 15, wherein the at least one processor is further configured to:
sample the identified pixels; and
perform weighted averaging to combine the samples to generate an intensity value for a position in one of the epipolar images.

* * * * *